(12) United States Patent
Sawata et al.

(10) Patent No.: US 10,082,987 B2
(45) Date of Patent: Sep. 25, 2018

(54) PRINT MANAGEMENT APPARATUS AND NON-TRANSITORY COMPUTER READABLE MEDIUM

(71) Applicant: FUJI XEROX CO., LTD., Tokyo (JP)

(72) Inventors: Naohiro Sawata, Kanagawa (JP); Bing Yan, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/496,329

(22) Filed: Apr. 25, 2017

(65) Prior Publication Data

US 2018/0113655 A1 Apr. 26, 2018

(30) Foreign Application Priority Data

Oct. 21, 2016 (JP) .................... 2016-207139

(51) Int. Cl.
*G06F 3/12* (2006.01)
(52) U.S. Cl.
CPC .......... *G06F 3/1205* (2013.01); *G06F 3/1208* (2013.01); *G06F 3/1226* (2013.01); *G06F 3/1255* (2013.01); *G06F 3/1256* (2013.01); *G06F 3/1258* (2013.01); *G06F 3/1263* (2013.01); *G06F 3/1288* (2013.01)
(58) Field of Classification Search
CPC .... G06F 3/1285; G06F 3/1288; G06F 3/1263; G06F 3/1275; G06F 3/1222; G06F 3/1238; G06F 3/1256; G06F 21/608; G06F 3/1267; G06F 3/1205; G06F 3/1208; G06F 3/1226; G06F 3/1255; G06F 3/1258; H04N 1/00954; H04N 1/00962; H04N 1/2338; H04N 1/2353; H04N 1/2392; H04N 1/0023

USPC .......... 358/1.15, 1.13, 1.14, 1.16, 450, 1.18, 358/453, 1.1, 1.9, 452, 517; 713/150, 713/170, 171; 715/249, 274

See application file for complete search history.

(56) References Cited

U.S. PATENT DOCUMENTS 5,436,730 A * 7/1995 Hube ..................... G06F 3/1297 358/1.16
6,618,163 B1 * 9/2003 Roosen ................. G06F 3/1207 358/1.13
7,697,156 B2 * 4/2010 Salgado ................. G06K 15/00 358/1.15

(Continued)

FOREIGN PATENT DOCUMENTS

JP 2016-177787 A 10/2016

*Primary Examiner* — Negussie Worku
(74) *Attorney, Agent, or Firm* — Oliff PLC

(57) ABSTRACT

A print management apparatus includes a memory that stores settings information of a print job, and printer information, a display controller that controls a display to simultaneously display a print job list representing a list of print jobs, and a printer list representing a list of printers, and a receiving unit that receives an input to the print job list displayed on the display. The display controller changes, in response to reception by the receiving unit of an input to select a print job displayed in the print job list, the display order of printers in the printer list by use of the settings information of the selected print job and the printer information. The receiving unit receives, from a screen displayed on the display and in which the changing of the display order is reflected, an input to select a destination printer to which to transmit a print job.

16 Claims, 8 Drawing Sheets

(56) References Cited

U.S. PATENT DOCUMENTS

| | | | |
|---|---|---|---|
| 2007/0091346 A1* | 4/2007 | Ogura | G06F 3/1204 358/1.14 |
| 2008/0123130 A1* | 5/2008 | Matsumoto | G06F 3/1207 358/1.15 |
| 2008/0297830 A1* | 12/2008 | Sewell | H04N 1/00278 358/1.15 |
| 2012/0099149 A1* | 4/2012 | Inoue | G06F 3/1204 358/1.15 |
| 2015/0055175 A1* | 2/2015 | Iida | G06K 15/1823 358/1.15 |
| 2016/0062713 A1* | 3/2016 | Oshima | G06F 3/1222 358/1.14 |
| 2016/0274847 A1* | 9/2016 | Suzuki | G06F 3/1256 |
| 2016/0292543 A1* | 10/2016 | Oishi | H04N 1/00938 |
| 2018/0113659 A1* | 4/2018 | Matsui | G06F 3/1256 |

* cited by examiner

FIG. 7

JOB EDITING  [← PREVIOUS JOB]  [NEXT JOB →]

| | |
|---|---|
| JOB ID | 6 |
| JOB NAME | |
| COPIES | 1 |
| TRANSMIT DESTINATION | BB01 ▼ |
| LOGICAL PRINTER | LP-C ▼ |
| STOCK | A4_WHITE_PLAIN PAPER ▼ |
| PROFILE | ☑ CMYK COLOR CORRECTION |
| | ● DEVICE PROFILE |
| | AS PER PRINTER SETTINGS ▼ |
| | OUTPUT PROFILE |
| | STANDARD PROFILE ▼ |
| | ○ CMYK INPUT PROFILE |
| | ▼ |
| | OUTPUT PROFILE |
| | ▼ |
| | ☐ CMYK SOURCE EMBED |
| OUTPUT DESTINATION | TRAY 1 ▼ |
| SENDER NAME | JOB MANAGEMENT OPTION |
| DEADLINE | 07/20 |

[CANCEL]  [APPLY]  [SAVE]

FIG. 8

| | | |
|---|---|---|
| JOB EDITING | ← PREVIOUS JOB | NEXT JOB → |

| | |
|---|---|
| JOB ID | 6 |
| JOB NAME | |
| COPIES | 1 |
| TRANSMIT DESTINATION | AA01 ▼ |
| LOGICAL PRINTER | BB01 |
| STOCK | A4_WHITE_PLAIN PAPER ▼ |
| PROFILE | ☑ CMYK COLOR CORRECTION |
| | ● DEVICE PROFILE |
| | AS PER PRINTER SETTINGS ▼ |
| | OUTPUT PROFILE |
| | STANDARD PROFILE ▼ |
| | ○ CMYK INPUT PROFILE |
| | ▼ |
| | OUTPUT PROFILE |
| | ▼ |
| | ☐ CMYK SOURCE EMBED |
| OUTPUT DESTINATION | TRAY 1 ▼ |
| SENDER NAME | JOB MANAGEMENT OPTION |
| DEADLINE | 07/20 |

CANCEL   APPLY   SAVE

PRINT MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-207139 filed Oct. 21, 2016.

BACKGROUND

Technical Field

The present invention relates to a print management apparatus and a non-transitory computer readable medium.

SUMMARY

According to an aspect of the invention, there is provided a print management apparatus including a memory that stores settings information of a print job, and printer information representing information related to a printer, a display controller that controls a display to simultaneously display a print job list representing a list of print jobs, and a printer list representing a list of printers, and a receiving unit that receives an input to the print job list displayed on the display. The display controller changes, in response to reception by the receiving unit of an input to select a print job displayed in the print job list, a display order of printers in the printer list by use of the settings information of the selected print job and the printer information. The receiving unit receives, from a screen displayed on the display and in which the changing of the display order is reflected, an input to select a destination printer to which a print job is to be transmitted.

BRIEF DESCRIPTION OF THE DRAWINGS

Exemplary embodiment of the present invention will be described in detail based on the following figures, wherein:

FIG. 7 illustrates an example of an editing screen for a print job;

FIG. 8 illustrates an example of an editing screen for a print job; and

DETAILED DESCRIPTION

Figure 1:
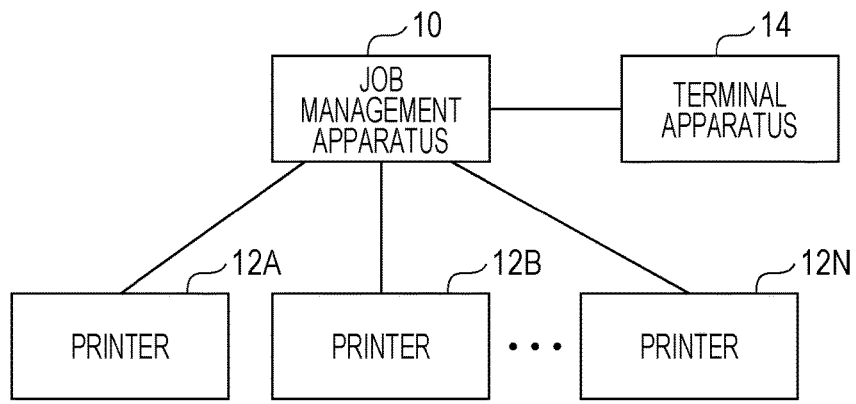
FIG. 1 is a block diagram of a print system according to an exemplary embodiment of the present invention.

FIG. 1 illustrates an example of a print system according to an exemplary embodiment of the present invention. The print system includes, for example, a job management apparatus 10, which serves as a print management apparatus, multiple printers (e.g., printers 12A, 12B, . . . and 12N), and a terminal apparatus 14. Hereinafter, printers 12A, 12B, . . . , and 12N will be generically referred to as "printer 12" or "printers 12" when there is no need to distinguish between these printers.

Each of the apparatuses mentioned above includes the function of communicating with another apparatus. The job management apparatus 10 and each of the printers 12 include the function of communicating with each other via a communication path such as a local area network (LAN) or the Internet, for example. The job management apparatus 10 and the terminal apparatus 14 include the function of communicating with each other via a communication path such as a LAN or the Internet, for example.

The job management apparatus 10 receives a print job (an example of a print command (print instruction)) from an external apparatus such as a personal computer (PC) or a workstation, and manages the print job. The job management apparatus 10 also manages each printer 12. For example, the job management apparatus 10 temporarily stores (spools) a print job transmitted from an external apparatus, and transmits the print job to the printer 12 selected from among multiple printers 12. The job management apparatus 10 includes the function of creating management screen data (e.g., management user interface data (management UI data)) representing a print job list, which represents a list of print jobs, and a printer list, which represents a list of printers 12, and supplying the created management screen data to the terminal apparatus 14.

A print job includes print data to be printed, and settings information. Print data represents, for example, data in which a group of draw commands for drawing the image of one or more pages to be printed is written in page description language (PDL). Examples of page description language to be used include Post Script (registered trademark) and Portable Data Format (PDF). Of course, print data may be in other formats (e.g., ART format). Hereinafter, print data written in page description language will be referred to as "PDL data".

Settings information of a print job includes multiple pieces of attribute information. Attribute information of a print job is information representing an attribute of a print job. Examples of attributes of a print job include color settings (e.g., color mode print or monochrome mode print), post-processing settings (e.g., the presence/absence of post-processing), stock (e.g., paper size, weight, type, and color), and the quantity of paper required for executing the print job. Of course, print job attributes may include attributes other than those mentioned above. For example, as basic setting attributes, attributes of a print job may include the number of copies, duplex/simplex print settings, spool options, printer mode (e.g., continuous tone or screen), paper tray settings, and page range settings. As paper or page attributes, attributes of a print job may include paper settings, the presence/absence of sheets for insertion, and the presence/absence of special pages. Attributes of a print job may further include the type of rasterization. As attributes of an output method (printing method), attributes of a print job may include layout settings, settings on print with insertion, the presence/absence of notes, the presence/absence of page numbers, the presence/absence of watermarking, and adjustment of scaling factor. As attributes of color printing, attributes of a print job may include RGB settings, CMYK settings, and spot color settings. As attributes related to post-processing, attributes of a print job may include output-side settings, output destination settings, hole-punch settings, fold settings, and trim settings. Other than those mentioned above, attributes of a print job may also include attributes related to image quality and attributes related to pre-processing.

The printer 12 is an apparatus that prints on a recording medium such as paper. The printer 12 is provided with a data processor (e.g., a digital front end (DFE) device). The data processor, which includes a raster image processor (RIP), applies rasterization to PDL data (print data) received from the job management apparatus 10 to convert the PDL data (print data) into image data in a raster format (e.g., bitmap format) (raster image data). Other than directly converting PDL data into raster image data, the data processor may convert PDL data into data in an intermediate language format (intermediate data), and then convert the intermediate data into raster image data. The printer 12 prints, on a recording medium, an image based on the raster image data. The printer 12 is implemented by, for example, a print engine employing the electrophotographic system, the inkjet system, or other systems. The printer 12 is, for example, a so-called production printer. The printers 12A, 12B, ..., and 12N may be of the same model or different models.

The terminal apparatus 14 is an apparatus such as a personal computer (PC), a tablet PC, a smartphone, or a cellular phone. The terminal apparatus 14 accesses the job management apparatus 10 by use of, for example, a Web browser, receives the above-mentioned management screen data (management UI data) from the job management apparatus 10, and displays the received management screen. For example, Internet Information Services (IIS) is used. The operator uses the terminal apparatus 14 to select, on the management screen, a print job and the destination printer 12 to which the print job is to be transmitted. When a print job and the destination printer 12 are selected by the operator, the job management apparatus 10 transmits the print job selected by the operator to the destination printer 12. The printer 12 executes printing in accordance with the print job.

Hereinafter, the print system will be described in detail.

Figure 2:
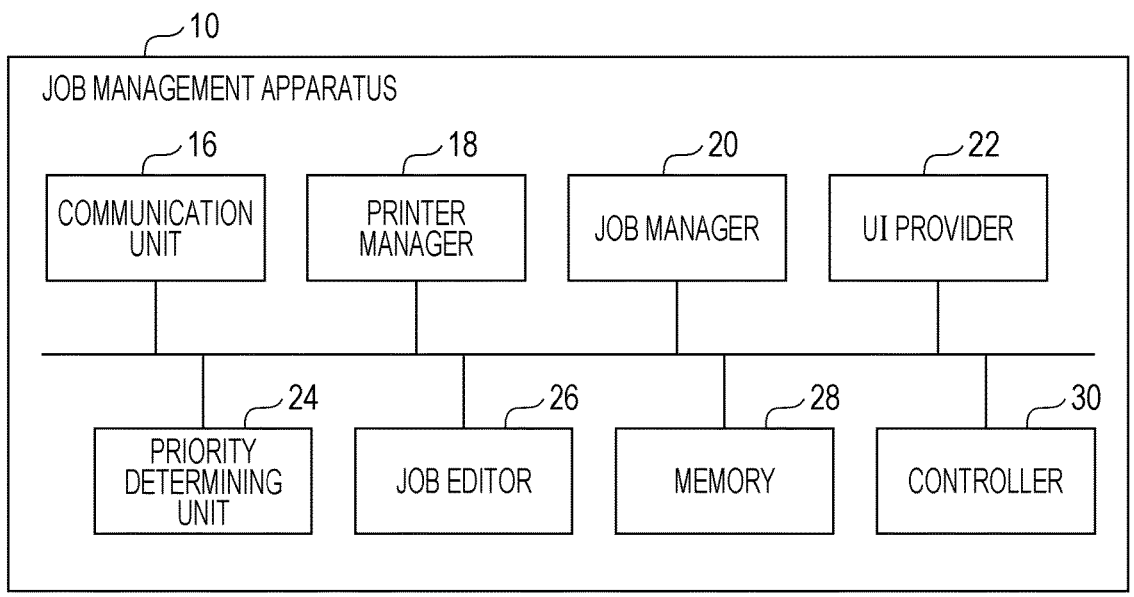
FIG. 2 is a block diagram of a job management apparatus according to the exemplary embodiment.

The configuration of the job management apparatus 10 will be described in detail below with reference to FIG. 2. FIG. 2 illustrates the configuration of the job management apparatus 10.

A communication unit 16 is a communication interface. The communication unit 16 includes the function of transmitting data to another apparatus, and the function of receiving data from another apparatus. The communication unit 16 includes, for example, a wireless communication function or a wire communication function, and includes the function of transmitting/receiving data via a communication path such as a LAN or the Internet.

A printer manager 18 includes the function of managing each printer 12. The printer manager 18 acquires printer information (e.g., information representing the characteristics, state, or other attributes of a printer) from each printer 12 regularly or at any given timing, and causes the acquired printer information to be stored into a memory 28. The printer manager 18 updates printer information stored in the memory 28 every time the printer manager 18 acquires printer information from the printer 12. The printer manager 18 functions as an example of a "memory controller".

Printer information includes multiple pieces of attribute information. Attribute information of the printer 12 is information representing attributes of the printer. Examples of attributes of the printer 12 include information such as the operational state of the printer (e.g., down, stopped, abnormally stopped, or unknown), the presence/absence of color print function, the presence/absence of post-processing function, the stock stored in the printer 12 (e.g., paper size, weight, type, and color), the quantity of paper stored in the printer 12, the quantity of toner present in the printer 12, expected finish time of an uncompleted print job, the location of the printer 12, and the failure rate of the printer 12. Of course, attributes of the printer 12 may include attributes other than those mentioned above.

A job manager 20 includes the function of managing a print job acquired from an external apparatus. The job manager 20 causes a print job to be temporarily stored into the memory 28 (spools a print job), for example. The job manager 20 also includes the function of transmitting a print job selected by the operator to the printer 12 selected by the operator. The job manager 20 functions as an example of a "memory controller".

A UI provider 22 includes the function of creating management screen data (management UI data) used for selecting a print job and the printer 12, and supplying the created management screen data to the terminal apparatus 14. A management screen is a screen including a print job list and a printer list. The print job list represents a list of print jobs managed by the job management apparatus 10. The printer list represents a list of printers 12 managed by the job management apparatus 10. For example, the print job list and the printer list are simultaneously displayed on the same management screen. In one example, the management screen data includes a Web page. On the terminal apparatus 14, the management screen is displayed by use of a Web browser. The operator selects a print job from the print job list, and selects the destination printer 12 from the print job list, via the management screen displayed on the terminal apparatus 14. Once a print job and the printer 12 are selected, the selected print job is transmitted to the selected printer 12, and printing is performed by the selected printer 12 in accordance with the print job. The UI provider 22 functions as an example of a display controller.

When a print job is selected by the operator on the management screen, the UI provider 22 uses the settings information of the print job and the printer information of each printer 12 to change the display order in which the printers 12 are displayed in the printer list. For example, the UI provider 22 changes the display order of the printers 12 in accordance with the priorities of the printers 12 determined by a priority determining unit 24 described later. The display order of the printers 12 will be described in detail later.

The priority determining unit 24 determines a priority for each of the printers 12 by use of the settings information of a print job selected by the operator and the printer information of the printer 12. For example, for each attribute of a print job and each attribute of the printer 12, the priority determining unit 24 calculates the degree of fit (determination value) between a print job selected by the operator and each printer 12, and determines a priority for each printer 12 based on the calculated degree of fit. The priority determining unit 24 may calculate the degree of fit by use of a weighting factor set for each attribute. The weighting factor may be changed by the operator.

The priority determining unit 24 may determine a priority for each printer 12 through two steps of processing. In this case, as a first step of processing, the priority determining unit 24 excludes any printer 12 that does not fit a print job selected by the operator. For example, with respect to a specific attribute among multiple attributes, the priority determining unit 24 excludes any printer 12 that does not fit a print job selected by the operator. The specific attribute may be changed by the operator. Next, as a second step of processing, for a group of printers 12 other than the excluded printer 12, the priority determining unit 24 determines the priority of each of the printers 12 by use of the settings information of the print job selected by the operator and the printer information of the printer 12.

When the priority of each printer 12 is determine by the priority determining unit 24, the UI provider 22 changes the display order of the printers 12 in the printer list in accordance with the priority of each printer 12. Further, the UI provider 22 may display, in the printer list, the printer 12 excluded through the first step of processing and the printer 12 not excluded through the first step of processing in a way that allows the excluded and non-excluded printers 12 to be distinguished from each other. In one example, the UI provider 22 may cause the printer 12 excluded through the first step of processing to be displayed in the printer list in a grayed-out state. For example, the background of the information representing the excluded printer 12 is displayed in gray or other colors, and selection of the grayed-out printer 12 by the operator is disabled (e.g., not accepted). In another example, the UI provider 22 may not display, in the printer list, the printer 12 excluded through the first step of processing.

A job editor 26 includes the function of editing the settings information of a print job selected by the operator. The edited settings information of the print job is stored into the memory 28.

The memory 28 is a storage device such as a hard disk. The memory 28 stores print jobs, printer information, various data, various programs, and other information.

A controller 30 includes the function of controlling operation of various units of the job management apparatus 10. The controller 30 functions as an example of a receiving unit.

The job management apparatus 10 may execute so-called pre-press processing (e.g., processing including imposition and other processes). Of course, pre-press processing may be executed by an external apparatus.

Figure 3:
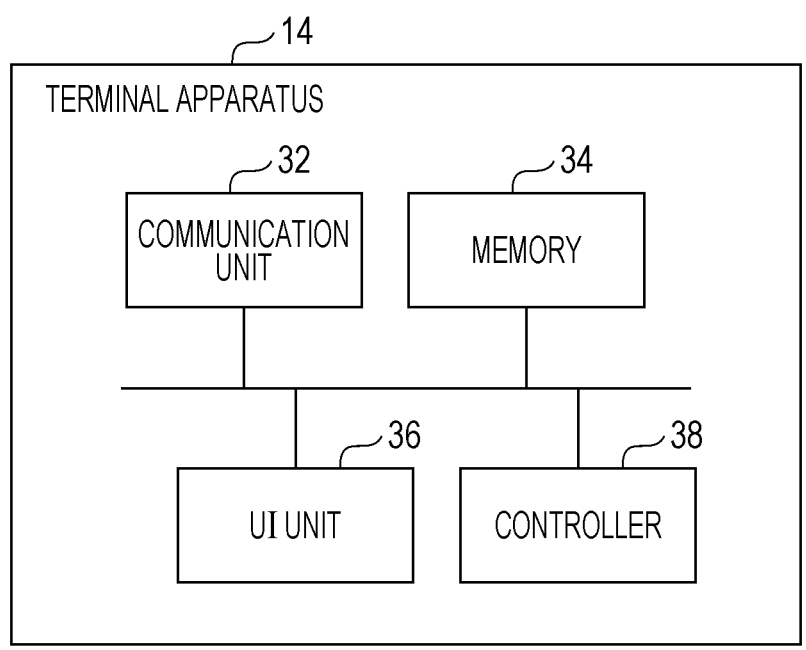
FIG. 3 is a block diagram of a terminal apparatus.

The configuration of the terminal apparatus 14 will be described in detail below with reference to FIG. 3. FIG. 3 illustrates the configuration of the terminal apparatus 14.

A communication unit 32 is a communication interface. The communication unit 32 includes the function of transmitting data to another apparatus, and the function of receiving data from another apparatus. The communication unit 32 includes, for example, a wireless communication function or a wire communication function, and includes the function of transmitting/receiving data via a communication path such as a LAN or the Internet.

A memory 34 is a storage device such as a hard disk. The memory 34 stores various data, programs such as a Web browser, address information of the job management apparatus 10, and other information.

A UI unit 36 is a user interface unit. The UI unit 36 includes a display and an operating unit. The display is, for example, a display device such as a liquid crystal display. The operating unit is an input device such as a touch panel, a keyboard, or a mouse. Of course, a device including both the display and the operating unit may be used as the UI unit 36.

A controller 38 controls operation of various units of the terminal apparatus 14. The controller 38 causes the management screen supplied from the job management apparatus 10 to be displayed on the UI unit 36.

The terminal apparatus 14 is used to select a print job and the printer 12. The operator selects, on the management screen displayed on the UI unit 36 of the terminal apparatus 14, a print job and the destination printer 12 for the print job. The printer 12 selected by the operator performs printing according to the print job selected by the operator. Further, the terminal apparatus 14 may be used to edit the settings information of the print job.

Figure 4:
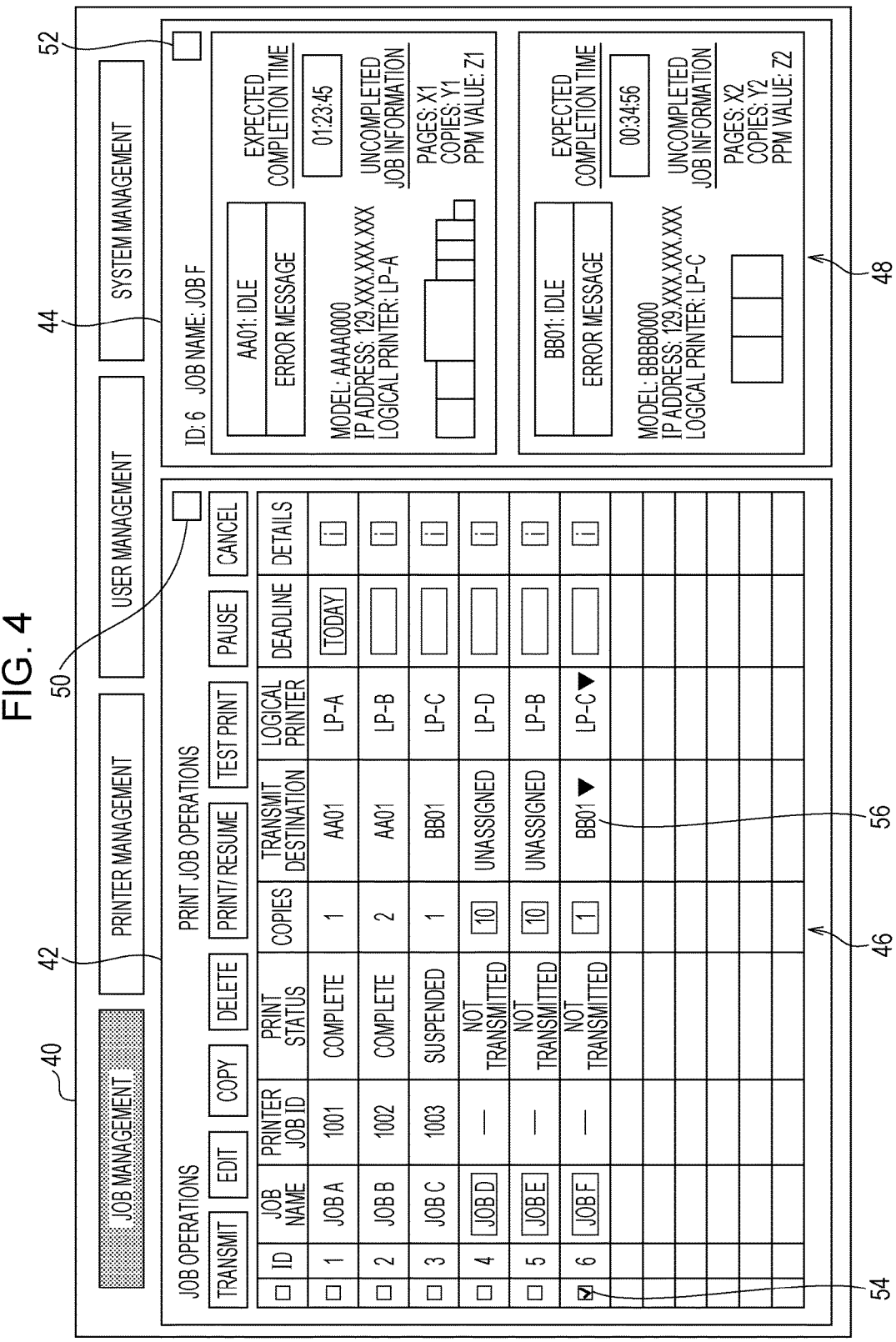
FIG. 4 illustrates an example of a management screen.

Hereinafter, a management screen supplied by the UI provider 22 will be described in detail with reference to FIG. 4. FIG. 4 illustrates an example of the management screen.

A management screen 40 is supplied from the job management apparatus 10 to the terminal apparatus 14, and displayed on the UI unit 36 of the terminal apparatus 14. The management screen 40 includes a job list display field 42 and a printer list display field 44. A job list 46 is displayed in the job list display field 42, and a printer list 48 is displayed in the printer list display field 44. The job list 46 and the printer list 48 are displayed simultaneously on the same management screen 40.

The job list 46 is a list of print jobs managed by the job management apparatus 10. Specifically, in the job list 46, the following items are associated with each other: ID, job name, printer job ID, information indicating print status, information indicating the number of copies to print, and information indicating the destination printer 12 (e.g., printer name), logical printer name, and information indicating print deadline. An ID represents information for managing a print job within the job list 46. A job name represents the name of a print job. A printer job ID represents information for managing a print job in each printer 12. Print status represents the status (state) of a print job. For example, if printing according to a print job is complete, a character string "Complete" is displayed in the Print Status field. If a print job is suspended, a character string "Suspended" is displayed in the Print Status field. If a print job has not yet been transmitted to the printer 12, a character string "Not Transmitted" is displayed in the Print Status field.

In the example illustrated in FIG. 4, six print jobs are displayed in the job list 46. Of course, if it is not possible to display the entire job list 46 in one screen, the area of the job list 46 to be displayed may be changed by operating a scroll bar, indicating to move to another page, or other methods.

For example, as for a print job with an ID "6", the name of the print job is "Job F", the print job has not yet been transmitted to the printer 12, and the number of copies to print is "1". Further, "BB01" is selected as the destination printer, "LP-C" is selected as the logical printer, and no deadline is specified.

The job list display field 42 shows the following images related to job operations: a Transmit button image, an Edit button image, a Copy button image, and a Delete button image. When a print job and the destination printer 12 are selected in the job list 46 by the operator, and the Transmit button image is pressed by the operator, the print job selected by the operator is transmitted from the job management apparatus 10 to the printer 12 selected by the operator. When a print job is selected by the operator, and the Edit button image is pressed by the operator, a screen (editing screen) for editing the settings information of the print job is displayed on the UI unit 36 of the terminal apparatus 14. On the editing screen, an instruction to edit settings information is given by the operator, and the job editor 26 edits the settings information in accordance with the editing instruction. When the operator presses the Copy button image, the selected print job is copied, and when the operator presses the Delete button image, the selected print job is deleted from the job list 46.

The job list display field 42 also shows the following images related to job operations: a Print/Resume button image, a Test Print button image, a Pause button image, and a Cancel button image. When one of these button images is operated by the operator, an operation such as printing, resuming of printing, test printing, pausing of printing, or cancelling of printing is executed in accordance with the operated button image.

Further, the job list display field 42 shows an update button image 50. When the update button image 50 is pressed by the operator, the job list 46 is updated, and the updated job list 46 is displayed in the job list display field 42. For example, suppose that the job management apparatus 10 receives a new print job after the job list 46 is displayed. In this case, when the update button image 50 is pressed by the operator, the job list 46 is updated, and the job list 46 including the new print job is displayed in the job list display field 42. Of course, the job list 46 may be updated automatically. For example, the job list 46 may be updated when the job management apparatus 10 receives a new print job, or the job list 46 may be updated regularly. This update process is executed by the UI provider 22.

The printer list 48 is a list of printers 12 managed by the job management apparatus 10. In the example illustrated in FIG. 4, information related to the printer 12 with a printer name "AA01", and information related to the printer 12 with a printer name "BB01" are displayed in the printer list. Of course, if it is not possible to display the entire printer list 48 in one screen, the area of the printer list 48 to be displayed may be changed by operating a scroll bar, indicating to move to another page, or other methods.

Information displayed in the printer list 48 will be described in detail below. For each printer 12, the printer list 48 shows, for example, a printer name, information indicative of status, an error message, information indicative of a printer model, information indicative of an IP address, a logical printer name, information indicative of the expected completion time (expected finish time) of an already-transmitted print job, and information related to an uncompleted print job. The printer 12 with a printer name "AA01" will be described in detail below. The printer 12 with a printer name "AA01" is currently idle, and the expected completion time for a print job already transmitted to the printer 12 is "One hour, 23 minutes, and 45 seconds". Further, the printer list 48 shows the following pieces of information as information related to a print job not yet completed by the printer 12: Pages (the number of pages), Copies (the number of copies), and page per minute (ppm) value. The expected completion time is calculated based on information such as the throughput of the printer 12, and the contents of a print job not yet completed by the printer 12. The expected completion time is, for example, a time obtained by dividing the total number of sides (equals the number of pages multiplied by the number of copies) specified by a print job, by a ppm value. The expected completion time may be calculated by the job management apparatus 10, or may be calculated by a data processor or other devices disposed in the printer 12.

An error massage represents information indicative of Printer Communication Error, Printer Power-off Detected, Cover Open, Paper Jam, Stacker Door Open, Front Cover Open, Paper Tray Open, Paper Output Destination Full, Spool Capacity Full, Toner Out, Paper Out, and other conditions. The state of the printer 12 is detected based on printer information acquired from the printer 12, and if the printer 12 is in an error status, an error massage indicative of the error is displayed.

An update button image 52 is displayed in the printer list display field 44. When the update button image 52 is pressed by the operator, the printer list is updated, and the updated printer list 48 is displayed in the printer list display field 44. Conditions such as the status of each printer 12, the number of jobs to be executed by each printer 12, and the quantity of toner or paper loaded in each printer 12 change from moment to moment. Information on these conditions is included in printer information acquired from each printer 12. As the printer manager 18 acquires printer information from each printer 12 regularly or at any given timing, the printer information stored in the memory 28 is updated. When the update button image 52 is pressed by the operator, the printer list 48 is updated, and the printer list 48 based on the updated printer information is displayed in the printer list display field 44. The print manager 18 may acquire printer information from each printer 12 in response to pressing of the update button image 52 by the operator. Of course, the printer list 48 may be updated automatically. For example, the printer list 48 may be updated automatically every time printer information is acquired. This update process is executed by the UI provider 22.

The management screen 40 shows a Job Management button image, a Printer Management button image, a User Management button image, and a System Management button image. When the Job Management button image is pressed by the operator, the job list 46 and the printer list 48 are displayed on the management screen 40. When the Printer Management button image is pressed by the operator, information for managing the printers 12 is displayed on the management screen 40. When the User Management button image is pressed by the operator, information for managing users is displayed on the management screen 40. When the System Management button image is pressed by the operator, information for managing the print system is displayed on the management screen 40.

When a print job is selected by the operator from the job list 46, the UI provider 22 changes the display order of the printers 12 in the printer list 48, based on the settings information of the print job and the printer information of each printer 12. For example, the UI provider 22 displays the printers 12 in the printer list 48 such that the printers 12 with attributes more closely matching those of a print job than other printers 12 are displayed as the printers 12 having higher priorities. The printers 12 with higher priorities will be displayed at higher positions in the printer list 48, for example. More specifically, the UI provider 22 changes the display order of the printers 12 in accordance with the priority of each printer 12 determined by using the settings information of the print job and the printer information of the printer 12. The changing of the display order based on priorities will be described later in detail.

A checkbox corresponding to each print job is displayed in the job list. As the operator operates the checkbox, a print job corresponding to the operated checkbox is selected. When, with a print job selected, the operator operates a checkbox corresponding to the selected print job, the selection of the print job is cancelled. Specifically, when the operator moves a mouse cursor to specify a checkbox corresponding to an unselected print job, the print job corresponding to the checkbox is selected. When the operator moves a mouse cursor to specify a checkbox corresponding to an already-selected print job, the selection of the print job corresponding to the checkbox is cancelled.

For example, when the operator operates the checkbox corresponding to a print job with an ID "6" as indicated by reference numeral 54, the print job with an ID "6" is selected by the operator. In this case, the UI provider 22 displays each printer 12 in the printer list 48 such that the more closely the attributes of the printer 12 match those of the print job with an ID "6", the higher the priority at which the corresponding printer 12 is displayed in the printer list 48. For example, if the attributes of a printer "AA01" more closely match the attributes of the print job with an ID "6" than do the attributes of a printer "BB01", then the printer "AA01" will be shown in precedence to (e.g., at a higher position than) the printer "BB01".

The UI provider 22 changes the display order of the printers 12 in the printer list 48 at the time when a print job is selected by the operator. When, with a print job already selected by the operator, the operator selects the print job again, the UI provider 22 does not change the display order of the printers 12 in the printer list 48 but maintains the display order. For example, suppose that a print job with an ID "6" is selected by the operator, and the display order of the printers 12 in the printer list 48 is changed accordingly. Subsequently, when, with the print job with an ID "6" selected, the operator selects the print job with an ID "6" again, the UI provider 22 does not change the display order but maintains the display order. This facilitates selection of a printer suited for a print job by the operator, in comparison to when the display order of the printers 12 is changed every time the same print job is selected.

The settings information of each print job can be changed in the job list 46. For example, with a print job selected by the operator, the operator is allowed to change settings for the print job such as its name, the number of copies, and deadline. When making such changes, the operator selects an already-selected print job again. For example, the operator operates a mouse cursor to specify (select) an already-selected print job (e.g., places a mouse cursor over the display field of an already-selected print job and then performs a click), and changes the settings information of the print job. The UI provider 22 does not respond to the re-selecting (re-specifying) of the print job but maintains the display order of the printers 12 in the printer list 48. For example, suppose that, with a print job with an ID "6" selected, the operator selects the print job with an ID "6" again to change the settings information of the print job. In this case, the UI provider 22 does not change the display order of the printers 12 in the printer list 48 but maintains the display order set by using the settings information of the print job and the printer information of each printer 12. Each of the name, the number of copies, deadline, and other information of a print job corresponds to an example of "another piece of settings information representing information other than a destination".

If an already-selected print job is deselected and another print job is selected by the operator, the UI provider 22 uses the settings information of the other print job and the printer information of each printer 12 to change the display order of the printers 12 in the printer list 48. For example, if the print job with an ID "6" is deselected and a print job with an ID "5" is selected, the UI provider 22 uses the settings information of the print job with an ID "5" and the printer information of each printer 12 to change the display order of the printers 12 in the printer list 48.

Figure 5:
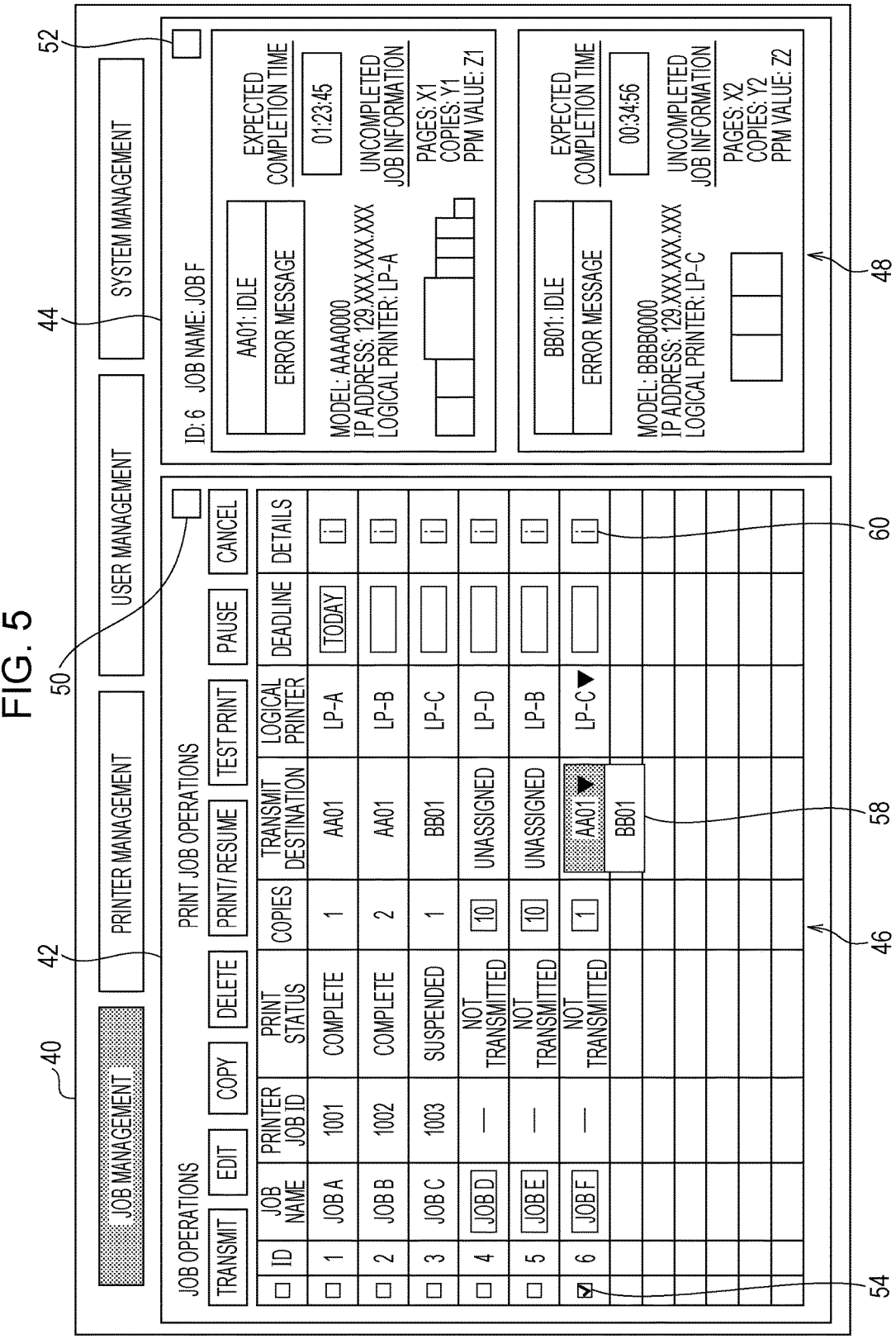
FIG. 5 illustrates an example of a management screen.

Hereinafter, the management screen 40 used in selecting the destination printer 12 will be described with reference to FIG. 4 and FIG. 5. FIG. 5 illustrates an example of the management screen 40.

When the display field for the destination printer 12 (which corresponds to an example of a ((first) printer selection portion) is specified in the job list 46 by the operator, the UI provider 22 displays, in the display field, a printer list representing a list of printers 12. In the example illustrated in FIG. 4, for an already-selected print job with an ID "6", a display field 56 for the destination printer 12 is specified by the operator. In this case, the UI provider 22 displays, in the display field 56, a printer list 58 representing a list of printers 12 as illustrated in FIG. 5. The printer list 58 is displayed in a pulldown format, for example. Of course, the printer list 58 may be displayed in other formats. When the operator selects the destination printer 12 from the list of printers 12 displayed in the printer list 58, the UI provider 22 displays, in the display field 56, the name of the printer 12 selected by the operator. For example, if a printer "BB01" is selected by the operator, the name "BB01" of the printer "BB01" is displayed in the display field 56 as illustrated in FIG. 4.

A list of printers 12 managed by the job management apparatus 10 is displayed in the printer list 58. At this time, the UI provider 22 causes the display order of the printers 12 in the printer list 48 within the printer list display field 44 to be reflected in the display order of the printers 12 in the printer list 58 within the job list display field 42. In other words, in the printer list 58 within the job list display field 42, the printers 12 are displayed in the same order as the order in which the printers 12 are displayed in the printer list 48 within the printer list display field 44. In the example illustrated in FIG. 5, in the printer list 48 within the printer list display field 44, the printers 12 are displayed in the order of the printer "AA01" followed by the printer "BB01". Therefore, in the printer list 58 within the job list display field 42 as well, the printers 12 are displayed in the order of the printer "AA01" followed by the printer "BB01". As described above, the display order of the printers 12 in the printer list 58 within the job list display field 42 changes in synchronization with the display order of the printers 12 in the printer list 48 within the printer list display field 44. This makes it easy for the operator to select the destination printer 12, in comparison to when the display order of the printers 12 in the printer list 58 differs from the display order of the printers 12 in the printer list 48.

When, with the destination printer 12 already selected, the display field for the destination printer 12 is specified by the operator, the UI provider 22 causes the printer list to be displayed in the display field. For example, when the destination printer 12 has been already selected for a print job with an ID "6", if the display field 56 for the destination printer 12 is specified by the operator for the print job with an ID "6", the UI provider 22 displays the printer list 58 in the display field 56. At this time, the UI provider 22 causes the display order of the printers 12 in the printer list 48 within the printer list display field 44 to be reflected in the display order of the printers 12 in the printer list 58 within the job list display field 42. In this case, the UI provider 22 may display, on the management screen 40, information (e.g., a message) indicating that the display order of the printers 12 has been reflected in the printer list 58.

For example, suppose that a printer "BB01" has been already selected by the operator as the destination printer 12 for a print job with an ID "6". If the operator specifies the display field 56 in this state, the printer list 58 is displayed in the display field 56. At this time, the printers 12 are displayed in the printer list 58 in the same order as the order in which the printers 12 are displayed in the printer list 48.

The UI provider 22 may display already-selected and unselected printers 12 in the printer list 58 within the job list display field 42 in a mutually distinguishable manner. For example, an already-selected printer "BB01" and an unselected printer "AA01" may be displayed in different colors, a mark or any other indication may be displayed for the already-selected printer "BB01" to indicate that this printer has already been selected, or the already-selected printer "BB01" and the unselected printer "AA01" may be displayed at different positions. This makes it easy for the operator to distinguish between already-selected and unselected printers 12, in comparison to when already-selected and unselected printers 12 are not displayed in a mutually distinguishable manner.

Of course, the UI provider 22 may not cause the display order of the printers 12 in the printer list 48 within the printer list display field 44 to be reflected in the display order of the printers 12 in the printer list 58 within the job list display field 42. In this case, for example, the UI provider 22 displays the already-selected printer "BB01" in precedence to other printers (e.g., displayed at the highest position) in the printer list 58 within the job list display field 42. If, with the printer list 58 displayed, the operator instructs information to be updated, the UI provider 22 may cause the display order of the printers 12 in the printer list 48 to be reflected in the display order of the printers 12 in the printer list 58.

A printer may be selected by a method other than the method mentioned above. For example, the destination printer 12 may be selected by a drag-and-drop operation. In one example, the operator selects a print job from the job list 46, and with the selection maintained, the operator moves an image (e.g., an icon) representing the selected print job by a drag-and-drop operation to the display area of the printer 12 within the printer list 48. The printer 12 at the location to which the image has been moved is selected as the destination printer 12.

In another example, the operator may directly select the destination printer 12 from the list of printers 12 displayed in the printer list 48. In this case, the operator selects the print job to be transmitted from the job list 46, and selects the destination printer 12 from the printer list 48.

Figure 6:
FIG. 6 illustrates an example of the settings information of a print job.

Hereinafter, displaying of the settings information of a print job will be described with reference to FIG. 6. For example, if an instruction to display the settings information of a print job is made by the operator on the job list 46 displayed in FIG. 5, the settings information of the print job is displayed on the UI unit 36 of the terminal apparatus 14. For example, when, with a print job with an ID "6" selected, the operator presses a Details button image 60 associated with the print job with an ID "6", the UI provider 22 displays the settings information of the print job with an ID "6" on the UI unit 36 of the terminal apparatus 14. FIG. 6 illustrates an example of the displayed settings information (properties information). For example, various pieces of attribute information are displayed for the print job with an ID "6".

Hereinafter, an editing screen (settings screen) for a print job will be described with reference to FIGS. 7 and 8. For example, when the print job to be edited is selected by the operator from the job list 46, and the Edit button image is pressed by the operator, a screen (editing screen) for editing settings information for the print job is displayed on the UI unit 36 of the terminal apparatus 14. FIG. 7 illustrates an example of the editing screen. In this case, a print job with an ID "6" is selected as the print job to be edited. An editing screen 62 shows the settings information of the print job with an ID "6". Specifically, the editing screen 62 shows items such as the names of individual attributes of the print job, and boxes (e.g., text boxes) used for editing the attributes. If any custom attribute exists, the editing screen 62 also shows items such as the name of the custom attribute, and a box used for editing the custom attribute. When the operator gives an instruction to edit the settings information (various attribute information) via the editing screen 62, the job editor 26 edits the settings information (various attribute information) in accordance with the editing instruction. The edited (changed) settings information is stored into the memory 28.

Further, the editing screen 62 shows a display field 64 for the destination printer 12 (which corresponds to an example of a second printer selection portion). When the display field 64 is selected by the operator on the editing screen 62, the UI provider 22 displays, in the display field 64, a printer list representing a list of printers 12. For example, the UI provider 22 displays, in the display field 64, a printer list 66 representing a list of printers 12 as illustrated in FIG. 8. The printer list 66 is displayed in a pulldown format, for example. Of course, the printer list 66 may be displayed in other formats. When the operator selects the destination printer 12 from the list of printers 12 displayed in the printer list 66, the UI provider 22 displays, in the display field 64, the name of the printer 12 selected by the operator. For example, if a printer "BB01" is selected by the operator, the name "BB01" of the printer "BB01" is displayed in the display field 64 as illustrated in FIG. 7.

The printer list 66 shows a list of printers 12 managed by the job management apparatus 10. At this time, the UI provider 22 causes the display order of the printers 12 in the printer list 48 within the printer list display field 44 to be reflected in the display order of the printers 12 in the printer list 66 within the editing screen 62. In other words, in the printer list 66 within the editing screen 62, the printers 12 are displayed in the same order as the order in which the printers 12 are displayed in the printer list 48 within the printer list display field 44. The display order in the printer list 48 within the printer list display field 44 is determined by using the settings information of a print job selected as the print job to be edited (e.g., a print job with an ID "6"), and the printer information of each printer 12. The display order in the printer list 66 within the editing screen 62 also becomes the same as the display order in the printer list 48. In the example illustrated in FIG. 4, in the printer list 48 within the printer list display field 44, the printers 12 are displayed in the order of the printer "AA01" followed by the printer "BB01". Accordingly, in the printer list 66 within the editing screen 62 as well, the printers 12 are displayed in the order of the printer "AA01" followed by the printer "BB01". As described above, the display order of the printers 12 in the printer list 66 within the editing screen 62 changes in synchronization with the display order of the printers 12 in the printer list 48 within the printer list display field 44. This makes it easy for the operator to select the destination printer 12, in comparison to when the display order of the printers 12 in the printer list 66 differs from the display order of the printers 12 in the printer list 48.

When, with the destination printer 12 already selected, the display field 64 for the destination printer 12 is specified by the operator, the UI provider 22 causes the printer list 66 to be displayed in the display field 64. At this time, the UI provider 22 causes the display order of the printers 12 in the printer list 48 within the printer list display field 44 to be reflected in the display order of the printers 12 in the printer list 66 within the editing screen 62. In this case, the UI provider 22 may display, on the editing screen 62, information (e.g., a message) indicating that the display order of the printers 12 has been reflected in the printer list 66.

For example, suppose that a printer "BB01" has been already selected by the operator as the destination printer 12 for a print job with an ID "6". If the operator specifies the display field 64 in this state, the printer list 66 is displayed in the display field 64, with the printers 12 displayed in the printer list 66 in the same order as the order in which the printers 12 are displayed in the printer list 48.

The UI provider 22 may cause already-selected and unselected printers 12 to be displayed in the printer list 66 within the editing screen 62 in a mutually distinguishable manner. For example, an already-selected printer "BB01" and an unselected printer "AA01" may be displayed in different colors, a mark or any other such indication may be displayed for the already-selected printer "BB01" to indicate that this printer has already been selected, or the already-selected printer "BB01" and the unselected printer "AA01" may be displayed at different positions. This makes it easy for the operator to distinguish between already-selected and unselected printers 12, in comparison to when already-selected and unselected printers 12 are not displayed in a mutually distinguishable manner.

Of course, the UI provider 22 may not cause the display order of the printers 12 in the printer list 48 within the printer list display field 44 to be reflected in the display order of the printers 12 in the printer list 66 within the editing screen 62. In this case, for example, the UI provider 22 displays the already-selected printer "BB01" in the printer list 66 within the editing screen 62 in precedence to other printers (e.g., at the highest position). If, with the printer list 66 displayed, the operator instructs information to be updated, the UI provider 22 may cause the display order of the printers 12 in the printer list 48 to be reflected in the display order of the printers 12 in the printer list 66.

If multiple print jobs to be edited are selected by the operator from the job list 46, and the Edit button image is pressed by the operator, this allows the settings information of individual print jobs to be edited individually on the editing screen 62. The editing screen 62 shows a button image 68 used to select the previous print job, and a button image 70 used to select the next print job. When the operator presses the button image 68 or the button image 70, the print job to be edited is switched between the multiple selected print jobs, and the settings information of the switched print job is displayed on the editing screen 62. When the print job to be edited is changed, the UI provider 22 changes, in accordance with the changed print job, the order in which the printers 12 are displayed in the printer list 66 within the editing screen 62. In other words, the UI provider 22 displays the printers 12 in the printer list 66 within the editing screen 62 in a display order that is determined by using the settings information of the changed print job and the printer information of each printer 12. Further, the UI provider 22 also changes the display order of the printers 12 in the printer list 48 within the printer list display field 44 to the same display order as the display order of the printers 12 in the printer list 66.

For example, suppose that a print job with an ID "5" and a print job with an ID "6" are selected as print jobs to be edited. If the print job with an ID "5" is selected and the settings information of this print job is displayed on the editing screen 62, the printers 12 are displayed in the printer list 66 in a display order that is determined by using the settings information of the print job with an ID "5" and the printer information of each printer 12. If the print job to be edited is changed to the print job with an ID "6", the printers 12 are displayed in the printer list 66 in a display order that is determined by using the settings information of the print job with an ID "6" and the printer information of each printer 12.

If the print job to be edited is not switched, and the same print job is selected as the print job to be edited, the UI provider 22 does not change but maintains the display order of the printers 12 in the printer list 66 within the editing screen 62, and also does not change but maintains the display order of the printers 12 in the printer list 48 within the printer list display field 44.

An update button image may be displayed on the editing screen 62. When the update button image is pressed by the operator, the printer list 66 within the editing screen 62 is updated, and the updated printer list 66 is displayed on the editing screen 62. As mentioned above, the status of a printer changes from moment to moment, and printer information is updated accordingly. When the update button image is pressed on the editing screen 62, the UI provider 22 displays the printers 12 in the printer list 66 in a display order that is determined by using the settings information of the print job to be edited and printer information that has been updated. Of course, the printer list 66 may be updated automatically. For example, the printer list 66 may be updated automatically every time printer information is acquired. This update process is executed by the UI provider 22.

If a change is made by the operator to the settings information of a print job, the UI provider 22 changes, in accordance with the change, the display order of the printers 12 in the printer list 66 within the editing screen 62, and the display order of the printers 12 in the printer list 48 within the printer list display field 44. In other words, the UI provider 22 displays the printers 12 in the printer list 48 or 66 in a display order that is determined by using the changed settings information and the printer information of each printer 12.

If it is not possible to display all of the settings information of a print job on the editing screen 62, the display area of the settings information may be changed by operating a scroll bar, indicating to move to another page, or other methods.

Figure 9:
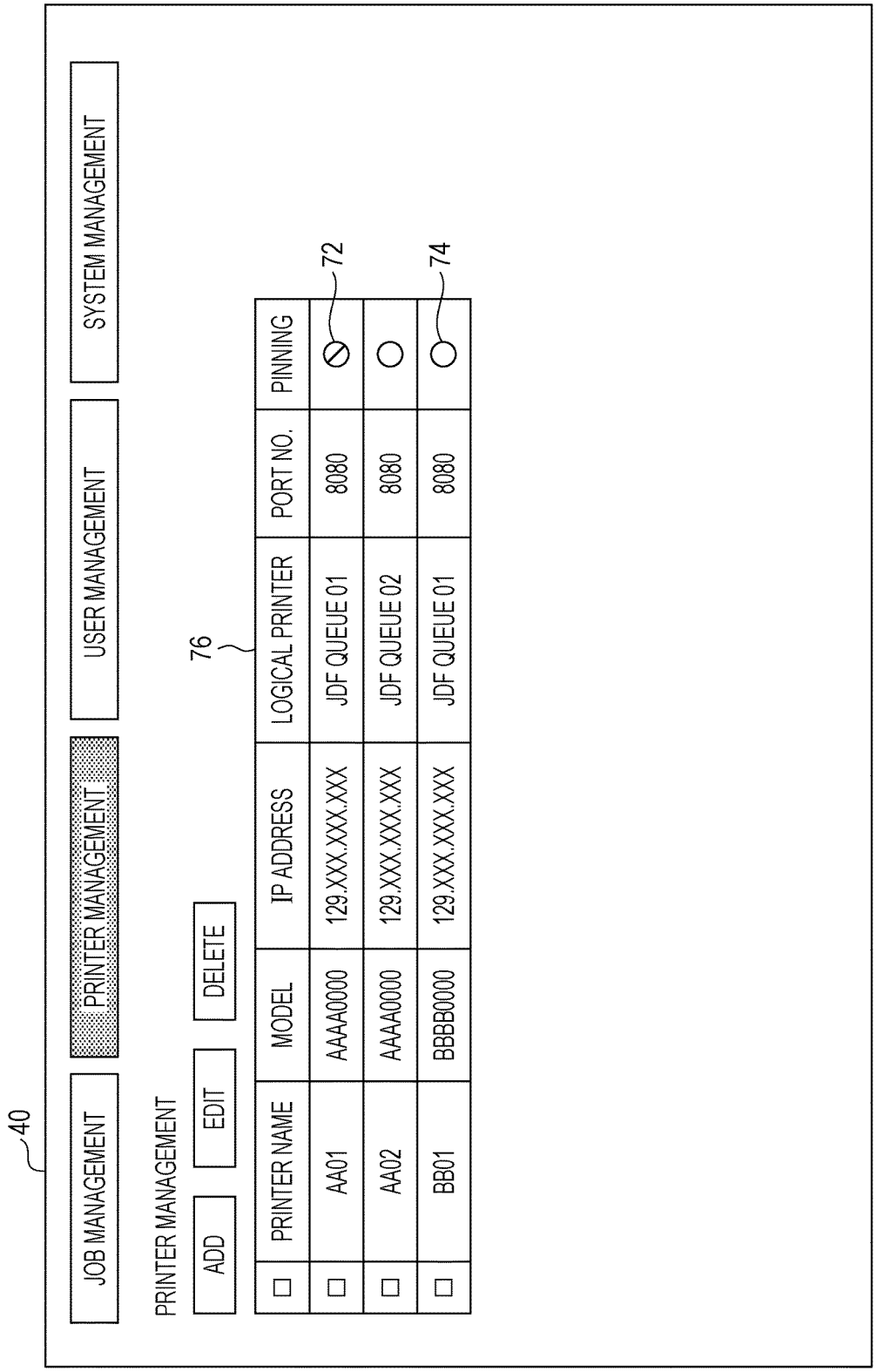
FIG. 9 illustrates an example of a printer management screen.

Printer management will be described below with reference to FIG. 9. For example, when the Printer Management button image illustrated in FIG. 4 is pressed by the operator, the UI provider 22 displays a printer list 76 on the management screen 40. The printer list 76 shows the following pieces of information in association with each other: printer name, information indicating the model of the printer 12, IP address of the printer 12, name of logical printer, port number of the printer 12, and pin setting filed (default setting field). A selecting button image 74 (pin selection button image) for selecting the default printer 12 is displayed in the default setting field for each printer 12. When the selecting button image 74 is pressed by the operator, the printer 12 corresponding to the pressed selecting button image 74 is selected as the default printer 12. The default printer 12 appears, for example, at a preset ordinal display position (default ordinal display position) in the printer list 48 within the printer list display field 44. For example, the default printer 12 is displayed at the highest position in the printer list 48. A cancel button image 72 (pin cancel button image) for cancelling the default setting is displayed in the default setting field corresponding to the default printer 12. In the example illustrated in FIG. 9, a printer "AA01" is selected as the default printer 12, and the cancel button image 72 is displayed in the default setting field corresponding to the printer "AA01". When the cancel button image 72 is pressed by the operator, the default setting for the printer 12 corresponding to the cancel button image 72 is canceled. For example, default setting information indicating the default printer 12 is stored in the memory 28 of the job management apparatus 10, for example, and the UI provider 22 displays the printer 12 indicated by the default setting information at a default ordinal display position.

The default printer 12 may be set for each individual operator. For example, the default printer 12 is set for each individual user who is logging in the job management apparatus 10 by use of the terminal apparatus 14. In this case, user identification information (e.g., user ID or user's name), and default setting information indicating the default printer 12 are stored into the memory 28 of the job management apparatus 10 in association with each other. The UI provider 22 displays, at a default ordinal display position, the default printer 12 corresponding to the user who has logged into the job management apparatus 10.

Hereinafter, a priority determination process executed by the priority determining unit 24 will be described in detail. The priority determining unit 24 determines a priority for each of the printers 12 by use of the settings information of a print job selected by the operator and the printer information of the printer 12. In this priority determination process, the priority of each printer 12 is determined by using, as an example of attributes, the following pieces of information: the operational state of the printer 12, the presence/absence of color printing, stock (e.g., paper size, weight, type, and color), paper quantity, the quantity of toner present in the printer 12, the presence/absence of post-processing, and the expected finish time of an uncompleted print job. Of course, attributes other than these attributes may be used. Examples of such other attributes include the location in which the printer 12 is placed and the failure rate of the printer 12.

A priority is calculated for each printer 12 by using the following values (attribute values) that are numerical representations of various attributes.
Operational state of the printer 12: attribute value "a"
Presence/absence of color printing: attribute value "b"
Presence/absence of post-processing: attribute value "c"
Stock: attribute value "d"
Paper quantity: attribute value "e"
Toner quantity: attribute value "f"
Expected finish time of an uncompleted print job: attribute value "g"

The following attribute values may be also used.
Location of the printer 12: attribute value "h"
Failure rate of the printer 12: attribute value "i"

An attribute value of an attribute is a value that represents, for the attribute, the degree of fit (determination value) between a print job selected by the operator and the printer 12. For example, the smaller the attribute value of an attribute, the higher the degree of fit between a print job and the printer 12 for that attribute. The priority determining unit 24 calculates individual attribute values for each printer 12. In other words, for each printer 12, the priority determining unit 24 calculates, with respect to each attribute, the degree of fit (attribute value) between a print job selected by the operator and the printer 12.

The priority determining unit 24 uses the attribute values "a" to "g" mentioned above to calculate, for each printer 12, a priority determination value defined by the following equation:

Priority Determination Value="a"+"b"+"c"+"d"+"e"+"f"+"g".

If the attribute value "h" and the attribute value "i" are used, the priority determination value is defined by the following equation:

Priority Determination Value="a"+"b"+"c"+"d"+"e"+"f"+"g"+"h"+"i".

The smaller the priority determination value, the higher the degree of fit between a print job and the printer 12. The priority determining unit 24 sets higher priorities for the printers 12 with smaller priority determination values. The UI provider 22 displays the printers 12 in the printer list 48 displayed in the printer list display field 44 in ascending order of priority determination value. In other words, the printers 12 with smaller priority determination values are displayed at higher positions in the printer list 48.

Hereinafter, calculation of various attribute values will be described in detail. Each attribute is assigned a weighting factor according to the attribute. The weighting factor may be changed by the operator.

Operational State of Printer 12

With regard to the operational state of the printer 12, "100 points (pt)" is used as a weighting factor. Information indicating the operational state of the printer 12 is acquired from the printer 12 by using Internet Printing Protocol (IPP), for example.

When the printer 12 is in one of the following operational states, the attribute value of the operational state (Printer State) is 1,000,000 pt. Since the attribute value is 1,000,000 pt, the printer 12 with this attribute value is practically excluded from the printers 12 to be selected. In other words, when the printer 12 is in down state, the state of the printer 12 is unknown, or the printer 12 is in stopped state, this means that the corresponding printer 12 is practically unusable, and thus excluded from the printers 12 to be selected.
Down state (Down)
State is unknown (Unknown)
Stopped or abnormally stopped state (Stopped)

When the printer 12 is in one of the following operational states, the attribute value (Printer State) is 0×100 pt.
Idle state (Idle)
Power-saving state (Sleep)

When the printer 12 is in one of the following operational states, the attribute value (Printer State) is 1×100 pt.
Running state (Running)
Cleanup state (Cleanup)
Setup or warm-up state (Setup)

Color/Monochrome Determination

With regard to color/monochrome determination, "100 pt" is used as a weighting factor. Information indicating whether the printer 12 supports color printing is acquired from the printer 12 by using IPP, for example.

When a print job requests color printing, and the printer 12 does not support color printing, the attribute value for color printing (Printer Type) is 1×100 pt.

In cases other than those mentioned above, the attribute value (Printer Type) is 0×100 pt.

Post-Processing Determination

With regard to post-processing determination, "50 pt" is used as a weighting factor. Information indicating whether the printer 12 has a post-processing apparatus is acquired from the printer 12 by using Simple Network Management Protocol (SNMP), for example.

If the function of the post-processing apparatus included in the printer 12 fits the post-processing requested by a print job, the attribute value for post-processing (Finisher) is 0×50 pt. For example, if the post-processing requested by a print job is stapling, and the printer 12 has a post-processing apparatus including a stapling function, the attribute value (Finisher) is 0×50 pt.

If the function of the post-processing apparatus included in the printer 12 does not fit the post-processing requested by a print job, the attribute value for post-processing (Finisher) is 1×50 pt. For example, if the post-processing requested by a print job is stapling, and the printer 12 does not have a post-processing apparatus including a stapling function, the attribute value (Finisher) is 1×50 pt.

Stock

With regard to stock (e.g., paper size, weight, type, and color), "100 pt" is used as a weighting factor. Information indicating the stored in the printer 12 is acquired from the printer 12 by using, for example, IPP, SNMP, or XBDS.

If the size of paper stored in the printer 12 does not fit the size of paper requested by a print job, the attribute value for stock (Stock) is 1,000,000 pt. Since the attribute value is 1,000,000 pt, the printer 12 with this attribute value is practically excluded from the printers 12 to be selected. In other words, if the size of paper stored in the printer 12 does not fit the size of paper requested by a print job, this means that the corresponding printer 12 is practically unusable, and thus excluded from the printers 12 to be selected.

If the stock (paper size, weight, type, and color) stored in the printer 12 fits the size of paper requested by a print job, the attribute value (Stock) is 0×100 pt.

If the size of paper stored in the printer 12 fits the size of paper requested by a print job, and if the weight, type, and color of paper stored in the printer 12 respectively do not fit the weight, type, and color of paper requested by the print job, the attribute value (Stock) is 1×100 pt.

Paper Quantity Determination

For paper quantity, "100 pt" is used as a weighting factor. Information indicating the quantity of paper stored in the printer 12 is acquired from the printer 12 by using, for example, IPP, SNMP, or XBDS.

If the printer 12 stores a sufficient quantity of paper required for a print job (e.g., if the quantity of paper A1 stored in the printer 12 is greater than the quantity of paper A2 required for a print job (A1>A2), and the value obtained by subtracting the quantity of paper A2 from the quantity of paper A1 (ΔA (=A1−A2)) is equal to or greater than a preset threshold Ath), the attribute value for paper quantity (Paper) is 0×100 pt.

If the quantity of paper A1 is slightly greater than the quantity of paper A2 (e.g., if the quantity of paper A1 is equal to or greater than the quantity of paper A2 (A1≥A2), and the quantity of paper ΔA is less than the threshold Ath), the attribute value (Paper) is 0.5×100 pt.

If the printer 12 does not store a quantity of paper required for a print job (if the quantity of paper A1 is less than the quantity of paper A2 (A1<A2)), the attribute value (Paper) is 1×100 pt.

Toner Quantity Determination

For toner quantity, "100 pt" is used as a weighting factor. Information indicating the quantity of toner present in the printer 12 is acquired from the printer 12 by using, for example, IPP, SNMP, or XBDS.

If the printer 12 stores a sufficient quantity of toner required for a print job (e.g., if the quantity of toner B1 present in the printer 12 is greater than the quantity of toner B2 required for a print job (B1>B2), and the value obtained by subtracting the quantity of toner B2 from the quantity of toner B1 (ΔB (=B1−B2)) is equal to or greater than a preset threshold Bth), the attribute value for toner quantity (Toner) is 0×100 pt.

If the quantity of toner B1 is slightly greater than the quantity of toner B2 (e.g., if the quantity of toner B1 is equal to or greater than the quantity of toner B2 (B1 B2), and the quantity of toner ΔB is less than the threshold Bth), the attribute value (Toner) is 0.5×100 pt.

If the printer 12 does not have a quantity of toner required for a print job (if the quantity of toner B1 is less than the quantity of toner B2 (B1<B2)), the attribute value (Toner) is 1×100 pt.

Expected Finish Time of Uncompleted Print Job

Information indicating the expected finish time of a print job being currently executed by the printer 12 is acquired from the printer 12 by using IPP, for example. The attribute value for expected finish time is an expected time (e.g., in seconds).

The expected finish time is, for example, a time obtained by dividing the total number of sides (equals the number of pages multiplied by the number of copies) specified by a print job, by a ppm value. A ppm value is acquired from the printer 12 by using IPP, for example. Of course, the ppm value of each printer 12 may be acquired in advance. The expected finish time may be calculated based on the number of print jobs.

As described above, for each printer 12, the priority determining unit 24 calculates, with respect to each attribute, an attribute value representing the degree of fit (attribute value) between a print job selected by the operator and the printer 12.

Process Flow of Priority Determination

Hereinafter, the process flow of priority determination will be described. The priority determining unit 24 executes, for example, two steps of processing to determine a priority for each printer 12.

When a given print job is selected by the operator from the job list 46, the priority determining unit 24 executes a first step of processing. The first step of processing involves excluding, from printer candidates for which to determine priority, the following printers 12 as the printers 12 that are unable to output the print job: the printer 12 in down state, the printer 12 whose state is unknown, the printer 12 in stopped (abnormally stopped) state, and the printer 12 that does not store the size of paper required by the print job. In other words, the priority determining unit 24 executes a first filtering process to exclude any printer 12 with a priority determination value (the sum total of attribute values) of equal to or greater than 1,000,000 pt.

Next, the priority determining unit 24 executes a second step of processing. In the second step of processing, for a group of printers 12 other than the above-mentioned excluded printers 12 (a group of printers 12 on which the print job can be output), the priority determining unit 24 determines a priority for each of the printers 12. In other words, for a group of printers 12 including the following printers: the printer 12 in idle state, the printer 12 in running state, the printer 12 in cleanup state, the printer 12 in setup state, and the printer 12 in power-saving state, and storing the size of paper requested by a print job, the priority determining unit 24 calculates the priority determination value of each of the printers 12, and based on the calculated priority determination value of each printer 12, the priority determining unit 24 determines a priority for each printer 12.

The UI provider 22 displays the printers 12 in the printer list 48 within the printer list display field 44 in a display order according to the priority of each printer 12 determined by the priority determining unit 24. At this time, the UI provider 22 may display, in the printer list 48, the printers 12 excluded in the first step of processing (e.g., the printers 12 with priority determination values equal to or greater than a threshold (e.g., 1,000,000 pt)) in a way that allows the excluded printers 12 to be distinguished from the printers 12 that have not been excluded. For example, the UI provider 22 may gray out the display of the excluded printers 12. In one example of such grayed-out display, the background color of the information representing the excluded printers 12 is displayed in gray or other colors, and selection of the excluded printers 12 is disabled or not accepted. In another example, the UI provider 22 may not display the excluded printers 12 in the printer list 48.

As described above, according to the exemplary embodiment, the order in which the printers 12 are displayed in the printer list 48 is changed by using the settings information of a print job and the printer information of each printer 12. This facilitates selection of the printer 12 suited for a print job by the operator, in comparison to when the printers 12 are displayed in a preset fixed display order. This also facilitates, if the settings information of a print job is changed, selection of the printer 12 suited for the changed print job.

Further, the printers 12 excluded in the first step of processing are grayed out or not displayed in the printer list 48. This prevents at least the printers 12 that are unable to output the print job from being selected by the operator. Accordingly, the destination printer 12 is selected by the operator from among a group of printers 12 on which the print job can be output. For example, the printer 12 in down state, the printer 12 whose state is unknown, the printer 12 in stopped state, and the printer 12 that does not store the size of printer requested by a print job practically correspond to unusable printers 12, and selection of such printers 12 by the operator is avoided. Of course, which printer 12 is to be excluded varies with the value of the weighting factor used in calculating each attribute value.

The printer 12 specified as the default printer 12 is displayed with the highest priority (e.g., at the highest position). Thus, the default printer 12 is displayed at a specific display position (e.g., at the highest position) irrespective of the priority determined by the priority determining unit 24.

The priority determining unit 24 may determine the priority of each printer 12 through a single step of processing. In this case, the priority determining unit 24 performs the second step of processing without performing the first step of processing. In other words, the priority determining unit 24 determines priorities based on priority determination values for all of the printers 12, rather than excluding the printers 12 that have priority determination values equal to or greater than a threshold. In this case, the UI provider 22 displays the printers 12 in the printer list 48 in a display order according to the priorities. At this time, the UI provider 22 may either gray out the display of the printers 12 with priority determination values equal to or greater than a threshold, or may not display such printers 12 in the printer list 48.

Enabled and disabled states of the automatic priority display function for the printers 12 (the function of displaying the printers 12 in the printer list 48 in a display order according to priorities determined by the priority determining unit 24) may be switched by the operator. When the automatic priority display function is enabled by the operator, the printers 12 are displayed in a display order determined in accordance with their priorities determined by the priority determining unit 24. When the automatic priority display function is disabled by the operator, the printers 12 are displayed in a preset order, for example. A switch button image for switching between the enabled and disabled states of the automatic priority display function may be displayed on the management screen 40. In this case, the enabled and disabled states of the automatic priority display function are switched by the operator pressing the switch button image.

If multiple print jobs are selected successively by the operator from the job list 46 (e.g., if another print job is selected within a preset time following selection of the first print job), the priority determining unit 24 determines priorities based on the print job displayed at the highest position in the job list 46 among the multiple print jobs. If multiple print jobs are selected separately by the operator from the job list 46 (e.g., if the interval of time between each selection exceeds a preset time), the priority determining unit 24 determines priorities based on the last selected print job. The UI provider 22 displays the printers 12 in the printer list 48 in a display order according to priorities determined by the priority determining unit 24.

If, with the destination printer 12 already selected in the job list 46 for a given print job, the selected printer 12 does not fit the print job, the UI provider 22 may display a warning message on the management screen 40, may display a warning box on the management screen 40 in popup form, or may display information indicating the currently selected printer 12 in a specific display color. An example of when the printer 12 that has been already selected does not fit a print job is when the priority determination value calculated for the print job and the already-selected printer 12 is equal to or greater than a threshold (e.g., 1,000,000 pt). In this case, a warning message or any other such indication is displayed at the time when the print job is selected by the operator, for example. This allows the operator to recognize whether the already-selected printer 12 is suited for the print job.

Now, a case is considered in which the destination printer 12 has been already selected for a given print job, and a change is made to the settings information of the print job on the editing screen 62 illustrated in FIGS. 7 and 8. In this case, if the already-selected printer 12 does not fit the print job whose settings information has been changed, the UI provider 22 may display a warning message or a warning box on the editing screen 62, may display information indicating the currently selected printer 12 in a specific display color, may display a confirmation screen used for confirming with the operator whether the settings information may be changed, or may display, on the editing screen 62, a changing screen used for changing the destination printer 12. For example, the priority determining unit 24 calculates a priority determination value for the already-selected printer 12 by using the changed settings information of the print job and the printer information of the already-selected printer 12. If the calculated priority determination value is equal to or greater than a threshold (e.g., 1,000,000 pt), the UI provider 22 displays a warning message or any other such indication on the editing screen 62. This allows the operator to recognize whether the already-selected printer 12 is suited for the print job whose settings information has been changed.

Each of the job management apparatus 10 and the terminal apparatus 14 is implemented by, for example, cooperation of hardware and software. Specifically, each of the job management apparatus 10 and the terminal apparatus 14 includes one or more processors such as CPUs (not illustrated). The functions of various units of each of the job management apparatus 10 and the terminal apparatus 14 are implemented by the one or more processors reading and executing a program stored in a storage device (not illustrated). In one example, the above-mentioned program is stored into the storage device via a recording medium such as a CD or a DVD, or via a communication path such as a network. In another example, various units of each of the job management apparatus 10 and the terminal apparatus 14 may be implemented by hardware resources such as processors or electronic circuits. A device such as a memory may be used in the implementation. In still another example, various units of each of the job management apparatus 10 and the terminal apparatus 14 may be implemented by components such as digital signal processors (DSPs) or field programmable gate arrays (FPGAs).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print management apparatus comprising:
 a memory that stores settings information of a print job, and printer information representing information related to a printer;
 a display controller that controls a display to simultaneously display a print job list representing a list of print jobs, and a printer list representing a list of printers; and
 a receiving unit that receives an input to select a print job displayed in the print job list displayed on the display,
 wherein the display controller changes, in response to reception by the receiving unit of the input, a display order of the printers in the printer list by use of the settings information of the selected print job and the printer information, and
 wherein the receiving unit receives, from a screen displayed on the display and in which the changing of the display order is reflected, an input to select a destination printer to which a print job is to be transmitted.

2. The print management apparatus according to claim 1, wherein the display controller changes the display order of the printers in the printer list in accordance with a priority determined in accordance with the settings information of the selected print job and the printer information.

3. The print management apparatus according to claim 2, wherein the display controller changes, for a group of printers other than a printer that does not fit the selected print job, the display order of the printers in the printer list in accordance with the priority.

4. The print management apparatus according to claim 3, further comprising
 a determining unit that excludes a printer that does not fit the selected print job, and for a group of printers other than the excluded printer, determines the priority by use of the settings information of the selected print job and the printer information.

5. The print management apparatus according to claim 4, wherein the settings information of the selected print job and the printer information each include a plurality of pieces of attribute information, and
 wherein the determining unit excludes, with respect to a specific piece of attribute information among the plurality of pieces of attribute information, a printer that does not fit the selected print job.

6. The print management apparatus according to claim 5, wherein the determining unit calculates, for each of the plurality of pieces of attribute information, a degree of fit between the selected print job and a printer, and determines the priority based on the calculated degree of fit.

7. The print management apparatus according to claim 6, wherein the determining unit calculates the degree of fit by use of a weighting factor set for each of the plurality of pieces of attribute information.

8. The print management apparatus according to claim 1, wherein the print job list shows a destination printer set for a print job, and
 wherein the display controller outputs warning information if, upon selection of a print job, it is determined by using the printer information that a destination printer set for the selected print job does not fit the selected print job.

9. The print management apparatus according to claim 1, wherein the display controller changes, in response to a change to the settings information of the selected print job, the display order of the printers in the printer list in accordance with the change.

10. The print management apparatus according to claim 9, wherein the display controller outputs warning information if, upon changing of the settings information of the selected print job, it is determined by using the printer information that a destination printer set for the selected print job does not fit the print job whose settings information has been changed.

11. The print management apparatus according to claim 1, wherein the print job list includes a printer selection portion used to select a destination printer for a print job, and a portion that shows another piece of settings information representing information other than a destination,
 wherein the other piece of settings information comprises information that is changed in the print job list in response to reception by the receiving unit of an input to change the other piece of settings information, and
 wherein the display controller does not change the display order of the printers in the printer list if an input to change the other piece of settings information for the selected print job is received by the receiving unit.

12. The print management apparatus according to claim 11,
 wherein if an input to specify the printer selection portion for the selected print job is received by the receiving unit, the display controller causes a list of printers to be displayed in the printer selection portion, and causes the display order of the printers in the printer list to be reflected in a display order of printers in the printer selection portion.

13. The print management apparatus according to claim 12,
 wherein if, with a destination printer already selected in the printer selection portion for the selected printer, an input to specify the printer selection portion is received by the receiving unit, the display controller causes the display order of the printers in the printer list to be reflected in a display order of printers in the printer selection portion.

14. The print management apparatus according to claim 13,
 wherein the display controller controls the display to display information indicating the reflecting of the display order.

15. The print management apparatus according to claim 12,
  wherein the receiving unit receives an input to select a destination printer from the list of printers displayed in the printer selection portion, and
  wherein if a printer has already been selected as a destination in the printer selection portion, the display controller controls the display to display, in the list of printers displayed in the printer selection portion, the selected printer and an unselected printer in a mutually distinguishable manner.

16. A non-transitory computer readable medium storing a program causing a computer to execute a process, the process comprising:
  controlling a memory to store settings information of a print job, and printer information representing information related to a printer;
  controlling a display to simultaneously display a print job list representing a list of print jobs, and a printer list representing a list of printers; and
  receiving an input to select a print job displayed in the print job list displayed on the display,
  wherein the controlling of the display includes changing, in response to reception of the input, a display order of the printers in the printer list by use of the settings information of the selected print job and the printer information, and
  wherein the receiving includes receiving, from a screen displayed on the display and in which the changing of the display order is reflected, an input to select a destination printer to which a print job is to be transmitted.

* * * * *